(12) United States Patent
Zheng et al.

(10) Patent No.: US 9,003,530 B2
(45) Date of Patent: Apr. 7, 2015

(54) INFORMATION PROCESSING METHOD, DEVICE, AND SERVER

(75) Inventors: Zhihao Zheng, Shenzhen (CN); Zhu Liang, Shenzhen (CN); Yu Chen, Shenzhen (CN); Zhenwei Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/114,854

(22) PCT Filed: Jul. 13, 2012

(86) PCT No.: PCT/CN2012/078613
§ 371 (c)(1),
(2), (4) Date: Dec. 16, 2013

(87) PCT Pub. No.: WO2013/078868
PCT Pub. Date: Jun. 6, 2013

(65) Prior Publication Data
US 2014/0298463 A1    Oct. 2, 2014

(30) Foreign Application Priority Data

Nov. 30, 2011   (CN) .......................... 2011 1 0390466
Dec. 31, 2011   (CN) .......................... 2011 1 0458356

(51) Int. Cl.
*H04L 29/06* (2006.01)
*G06Q 10/00* (2012.01)

(52) U.S. Cl.
CPC ............ *H04L 63/1441* (2013.01); *G06Q 10/00* (2013.01); *H04L 63/1416* (2013.01)

(58) Field of Classification Search
None
See application file for complete search history.

(56) References Cited

U.S. PATENT DOCUMENTS 6,321,338 B1 * 11/2001 Porras et al. .................... 726/25

6,484,203 B1 * 11/2002 Porras et al. .................. 709/224
(Continued)

FOREIGN PATENT DOCUMENTS

| CN | 101605032 | 12/2009 |
|----|-----------|---------|
| CN | 101753725 | 6/2010 |
| CN | 102012926 | 4/2011 |

OTHER PUBLICATIONS

Tahara, Shinya; Kawaguchi, Nobutaka; Inaba, Taro; Shiozawa, Hidekazu; Shigeno, Hiroshi; Okada, Ken-ichi. MSP-system: Mobile Secure Passport System to detect Malicious Users. Information Assurance and Security Workshop, 2007. Pub. Date: 2007. Relevant p.: 277-283. http://ieeexplore.ieee.org/stamp/stamp.jsp?tp=&arnumber=4267572.*

Chong, Cheun Ngen; Kamperman, Frank. Reducing Unauthorized Content Distribution with Monitoring. 4th IEEE Consumer Communications and Networking Conference, 2007. Pub. Date: 2007. Relevant pp.: 1053-1057. http://ieeexplore.ieee.org/stamp/stamp.jsp?tp=&arnumber=4199300.*

(Continued)

*Primary Examiner* — Dede Zecher
*Assistant Examiner* — Jeremiah Avery
(74) *Attorney, Agent, or Firm* — Lowe Hauptman & Ham, LLP

(57) ABSTRACT

Embodiments of the present invention provide an information processing method, device, and server, relating to the technical field of communications, and solving the problem that a user continuously releasing illegal information in the network. The method comprises: receiving network information; determining, according to the network information, a rating result of a network object corresponding to the network information; controlling the network object according to the rating result of the network object corresponding to the network information. Embodiments of the present invention further provide an information processing device and server. The present invention is applied to the network information management.

22 Claims, 8 Drawing Sheets

(56) References Cited

U.S. PATENT DOCUMENTS

| | | | | |
|---|---|---|---|---|
| 7,523,191 | B1* | 4/2009 | Thomas et al. | 709/224 |
| 7,730,142 | B2* | 6/2010 | LeVasseur et al. | 709/206 |
| 7,774,363 | B2* | 8/2010 | Lim | 707/781 |
| 7,797,421 | B1* | 9/2010 | Scofield et al. | 709/224 |
| 7,974,849 | B1* | 7/2011 | Begole et al. | 705/1.1 |
| 8,126,882 | B2* | 2/2012 | Lawyer | 707/723 |
| 8,150,842 | B2* | 4/2012 | Brougher et al. | 707/723 |
| 8,291,492 | B2* | 10/2012 | McNally et al. | 726/21 |
| 8,321,437 | B2* | 11/2012 | Lim | 707/758 |
| 8,407,791 | B2* | 3/2013 | Granstedt et al. | 726/22 |
| 8,429,545 | B2* | 4/2013 | Dixon et al. | 715/760 |
| 8,539,359 | B2* | 9/2013 | Rapaport et al. | 715/751 |
| 8,751,633 | B2* | 6/2014 | Holloway et al. | 709/224 |
| 2007/0005716 | A1* | 1/2007 | LeVasseur et al. | 709/206 |
| 2012/0072983 | A1* | 3/2012 | McCusker et al. | 726/22 |
| 2012/0324091 | A9* | 12/2012 | Raleigh et al. | 709/224 |

OTHER PUBLICATIONS

Zhang, Xiaolong; Zeng, Na; Tang, J; Xu, Xin. Web User Behavior Monitoring for Campus Networks. 2010 IEEE International Conference on Systems Man and Cybernetics (SMC). Pub. Date: 2010. Relevant pp.: 3828-3833. http://ieeexplore.ieee.org/stamp/stamp.jsp?tp=&arnumber=5642026.*

Yang, You-Sin; Liu, Huai-Jen. User-Level Packet Filter for the IP Address Abuse/Counterfeit Problem in Wireless/Wired Networks. 2010 Sixth International Conference on Mobile Ad-hoc and Sensor Networks (MSN). Pub. Date: 2010. Relevant pp.: 239-242. http://ieeexplore.ieee.org/stamp/stamp.jsp?tp=&arnumber=5714508.*

International Search Report for PCT/CN2012/078613, citing the above reference(s).

* cited by examiner

INFORMATION PROCESSING METHOD, DEVICE, AND SERVER

CROSS REFERENCE TO RELATED APPLICATION

This application claims the priority of International Application No. PCT/CN2012/078613, filed on Jul. 13, 2012, which claims priority to Chinese Application No. 201110390466.3, filed Nov. 30, 2011, and Chinese Application No. 201110458356.6, filed Dec. 31, 2011. The entire disclosures of each of the above applications are incorporated herein by reference.

BACKGROUND OF THE INVENTION

1. Field of the Invention

The present disclosure relates to a communication field, and more particularly, to an information processing method, apparatus, and related server.

2. Description of the Prior Art

Network has been a part of human's life. People gather information from the network and share useful information on the network with other network users.

People can post information on virtual social networking space (e.g. twitter or QQ space which is developed by the applicant) and show themselves in many ways. For example, they can write a diary there, upload their pictures, listen to music, and share their feeling. The afore-mentioned information can be called as UGC (user generated content). User can have friends in the virtual social networking space so that they can read the UGC from their friends on the virtual social networking space. Furthermore, the friends of user A can directly read the content he has posted in the personal center, and other users can read the content through the space address of user A. Besides for reading the information, friends or other users can copy, forward, share, or spread the UGC posted by the user to make the UGC spread more broadly.

However, some users post illegal UGC, which does not comply with China internet regulations. For example, these UGC may be Falun Dafa, porn, earthquake rumors, or any other information influencing the society. Assume that the user posting illegal UGC as user A, and a friend of user A is user B. It means that user B can read all of the UGC posted by user A, which includes afore-mentioned illegal UGC. Furthermore, user B can forward these illegal UGC such that more users will read the illegal UGC, also.

In order to prevent illegal UGC from being spread over the network, corresponding solutions have been introduced. Specifically, when the user of the virtual social networking space read an illegal UGC in his own space, he can report it to the back end such that an examiner can delete the illegal UGC according to the reporting condition of the UGC.

In the aforementioned information managing process, the applicants find that the related art has following problems: the server only processes illegal UGC without dealing with those who posted illegal UGC. It means that those who posted illegal UGC are able to continuously post illegal UGC and thus the illegal UGC problem still remains.

SUMMARY OF THE INVENTION

It is therefore one of the primary objectives of the claimed invention to provide an information processing method, apparatus, and server, to solve the above-mentioned problem of illegal UGC.

According to an exemplary embodiment of the claimed invention, an information processing method is disclosed. The information processing method comprises: receiving network information; determining a level of a network object corresponding to the network information according to the network information; and performing a control process on the network object according to the level of the network object corresponding to the network information.

According to another exemplary embodiment of the claimed invention, an information processing device is disclosed. The information processing device comprises: a receiving module, for receiving network information; an information processing module, for determining a level of a network object corresponding to the network information according to the network information, and performing a control process according to the level of the network object.

According to another exemplary embodiment of the claimed invention, a computer readable medium is disclosed. The computer readable medium stores an instruction set, wherein when the instruction set is executed, a machine reading the computer readable medium is capable of executing aforementioned information processing method.

According to another exemplary embodiment of the claimed invention, an information processing device is disclosed. The information processing device comprises: a storage device, for storing instructions; a processor, coupled to the storage device, the processor executes the instructions stored inside the storage device to receive network information, determine a level of a network object corresponding to the network information according to the network information; and perform a control process on the network object according to the level of the network object corresponding to the network information.

According to another exemplary embodiment of the claimed invention, a server, is disclosed. The server comprises the aforementioned information apparatus claimed in claims.

In contrast to the related art, the present disclosure has following advantages.

Through the embodiments of the present disclosure, the present disclosure can send the file to be scanned to a plurality of engines to scan, and integrate the scanning information returned by the engines, determine the scanning result of the file, and give a feedback. Therefore, the present disclosure virus killing procedure can support multi-engine killing, integrate the scanning information of the engines according to actual strategies, efficiently utilize advantages of different engines, support all kinds of virus-killing requirements, and raise the accuracy of virus killing and system safety.

These and other objectives of the claimed invention will no doubt become obvious to those of ordinary skill in the art after reading the following detailed description of the preferred embodiment that is illustrated in the various figures and drawings.

DETAILED DESCRIPTION OF THE PREFERRED EMBODIMENT

Figure 1:
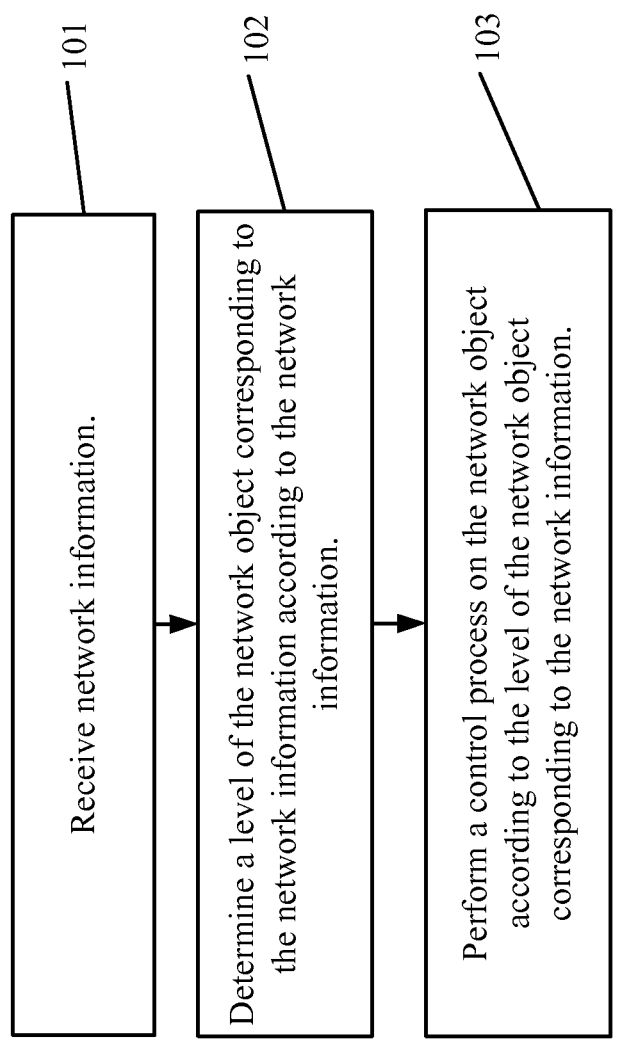
FIG. 1 is a flow chart of an information processing method according to a first embodiment of the present disclosure.

Please refer to FIG. 1, which is a flow chart of an information processing method according to a first embodiment of the present disclosure. As shown in FIG. 1, an information processing method is disclosed. The information processing method can be a computer process, stored inside a computer readable medium (such as an optical disk). The information processing method comprises following steps:

Step 101: receive network information.

In this embodiment, the network information can be reporting information reported by a reporting user. The reporting information comprises information of a reported user and a reported content. The network information can be the UGC posted by a user, and the UGC can comprise a corresponding signature word. That is, this step can be to receive the reporting information from a reporting user or to receive the UGC posted by a user and obtain a signature word from the UGC.

Step 102: determine a level of the network object corresponding to the network information according to the network information.

After the network information is received, the present disclosure determines the level of the network object corresponding to the network information according to the network information. Upon the condition that the network information is reporting information and the network object corresponding to the network information is a reported user, in this step, the present disclosure determines the level of the reported user corresponding to the reporting information according to the information and determines whether the reported user is a malicious user, a genuine user, or a user to be determined. Upon the condition that the network information is the UGC posted by the user and the network object corresponding to the network information is the UGC, in this step, the present disclosure determines the level of the signature word contained inside the UGC according to a relationship between signature words and levels, where the relationship is predetermined according to the UGC and predetermined scores.

Step 103: perform a control process on the network object according to the level of the network object corresponding to the network information.

After the level of the network object corresponding to the network information is received, the present disclosure performs a control process on the network object according to the level. Specifically, upon the condition that the network information is the reporting information, in this step, the present disclosure performs a control process on the reported user according to the level of the reported user corresponding to the reporting information. Upon the condition that the reported user is a malicious user, the present disclosure prohibits the reported user from logging in. Upon the condition that the reported user is not a malicious user, the present disclosure determines whether the reported user is a genuine user or a user to be determined. Upon the condition that the reported user is a genuine user, the present disclosure transfers the information posted or forwarded by the reported user to a first designated address. Upon the condition that the reported user is a user to be determined, the present disclosure transfers the information posted by the reported user according to the reporting number of the information posted by the reported user. Upon the condition that the network information is the UGC, in this step, the present disclosure performs a corresponding operation on the UGC according to a predetermined relationship between levels of the signature words of the UGC and operations.

In this embodiment, the present disclosure provides an information processing method, which receives the network information, determines the level of the network object corresponding to the network information according to the network information, and performs a control process on the network object according to the level of the network object corresponding to the network information. Therefore, the present disclosure can prevent the illegal UGC from being continuously spread on the network and thus solve the aforementioned problem.

Figure 2:
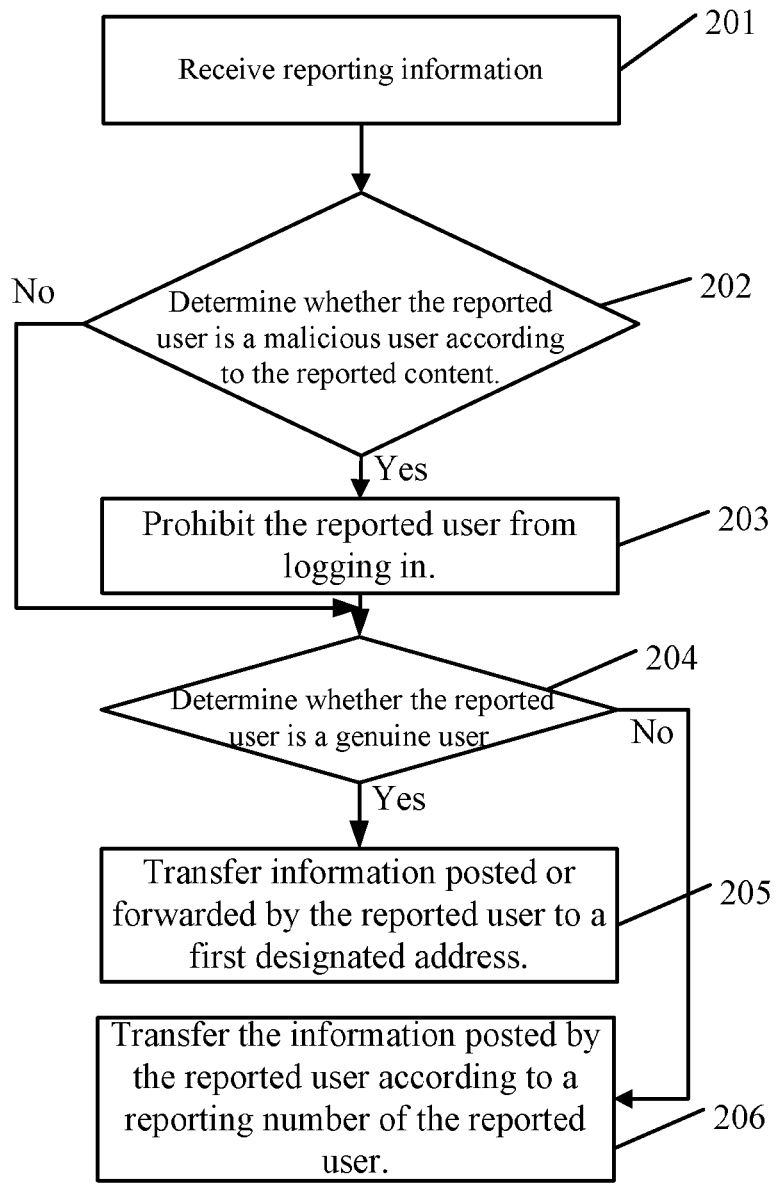
FIG. 2 is a flow chart of an information processing method according to a second embodiment of the present disclosure.

In addition, the present disclosure provides an information processing method. As shown in FIG. 2, the information processing method can be a computer process, stored inside a computer readable medium (such as an optical disk), and the information processing method comprises following steps:

Step 201: Receive reporting information having information of a reported user and a reported content.

In order to prevent some users from posting or forwarding illegal information, when a user reads inappropriate information, the user can report the user who posted or forwarded illegal information.

Specifically, the server receives the reporting information of the user. The reporting information contains the information of the reported user, the reported content. Please note, the information of the reported user can be information for identifying the identity of the reported user.

Step 202: Determine whether the reported user is a malicious user according to the reported content. Upon the condition that the user is a malicious user, perform step 203, otherwise, perform step 204.

In this step, the present disclosure determines whether the reported user is a malicious user. The reported content can comprise illegal information posted or forwarded by the reported user.

The malicious user is a user who has been reported to post more illegal information and/or forward more illegal information.

Specifically, upon the condition that the reported user is a malicious user, step 203 is then performed. Upon the condition that the reported user is not a malicious user, step 204 is then performed.

Step 203: Prohibit the reported user from logging in.

In order to prohibit the malicious user from posting or forwarding illegal information, the server prohibit the malicious user from logging in such that the malicious user is no longer post or forward any information. The flow is ended.

Step 204: Determine whether the reported user is a genuine user. Upon the condition that the reported user is a genuine user, then perform step 205. Otherwise, perform step 206.

It does not mean that the non-malicious user never post or forward illegal information.

Therefore, in order to control the illegal information more efficiently, the server not only has to control the malicious user, but has to further determine whether a non-malicious user is a genuine user or a user to be determined and perform different operations on different kinds of users.

Upon the reported user is a genuine user, the step 205 is performed. Upon the reported user is a user to be determined, the step 206 is performed.

Step 205: Transfer information posted or forwarded by the reported user to a first designated address.

In general, information posted or forwarded by a genuine user contains very low illegal information. Therefore, the user transfers the information posted or forward by a genuine user to the first designated address.

In an embodiment of the present disclosure, the first designated address can comprise the space addresses of friends of the genuine user, related website addresses, and etc.

The present disclosure transfer the information posted or forwarded by the genuine user to a friend's space address such that the genuine user can easily read the information in the personal space. In this embodiment, the information posted or forwarded by the genuine user is displayed in the friend space such that friends of the genuine user can read the information. Furthermore, the information posted or forwarded by the genuine user is transferred to related websites such that more network users can read the information. This ensures the information posted or forwarded by the genuine user to be shared. The flow is ended.

Step 206: Transfer the information posted by the reported user according to a reporting number of the reported user.

Upon the condition that the reported user is a user to be determined, even the reported user is neither a malicious user nor a genuine user, the present disclosure transfers the information posted by the reported user according to a reporting number of the reported user. Please note, the information posted by a user to be determined may comprise illegal information or approved information, where the approved information represents information which has never been reported yet.

Specifically, when the present disclosure transfers the information of a user to be determined, the server can only transfer the approved information to the second designated address without transferring the illegal information to the second designated address.

In this embodiment, the present disclosure provides an information processing method. The information processing method comprises: receiving reporting information which comprises information of the reported user and a reported content; determining whether the reported user is a malicious user according to the reported content; upon the condition that the reported user is a malicious user, prohibiting the reported user from logging in; upon the condition that the reported user is not a malicious user, determining whether the reported user is a genuine user or a user to be determined; upon the condition that the reported user is a genuine user, transferring information posted or forwarded by the reported user to a first designated address; and upon the condition that the reported user is a user to be determined, transferring information posted by the reported user according to a reporting number of the information posted by the reported user. Because the present disclosure prohibits the malicious user from logging in, this prevents the malicious users from continuously posting or forwarding illegal information and allows non-malicious users continuously to post or forward not-illegal information. Different kinds of users can execute differential experiences and thus control and eliminate the malicious users and illegal information.

Figure 3:
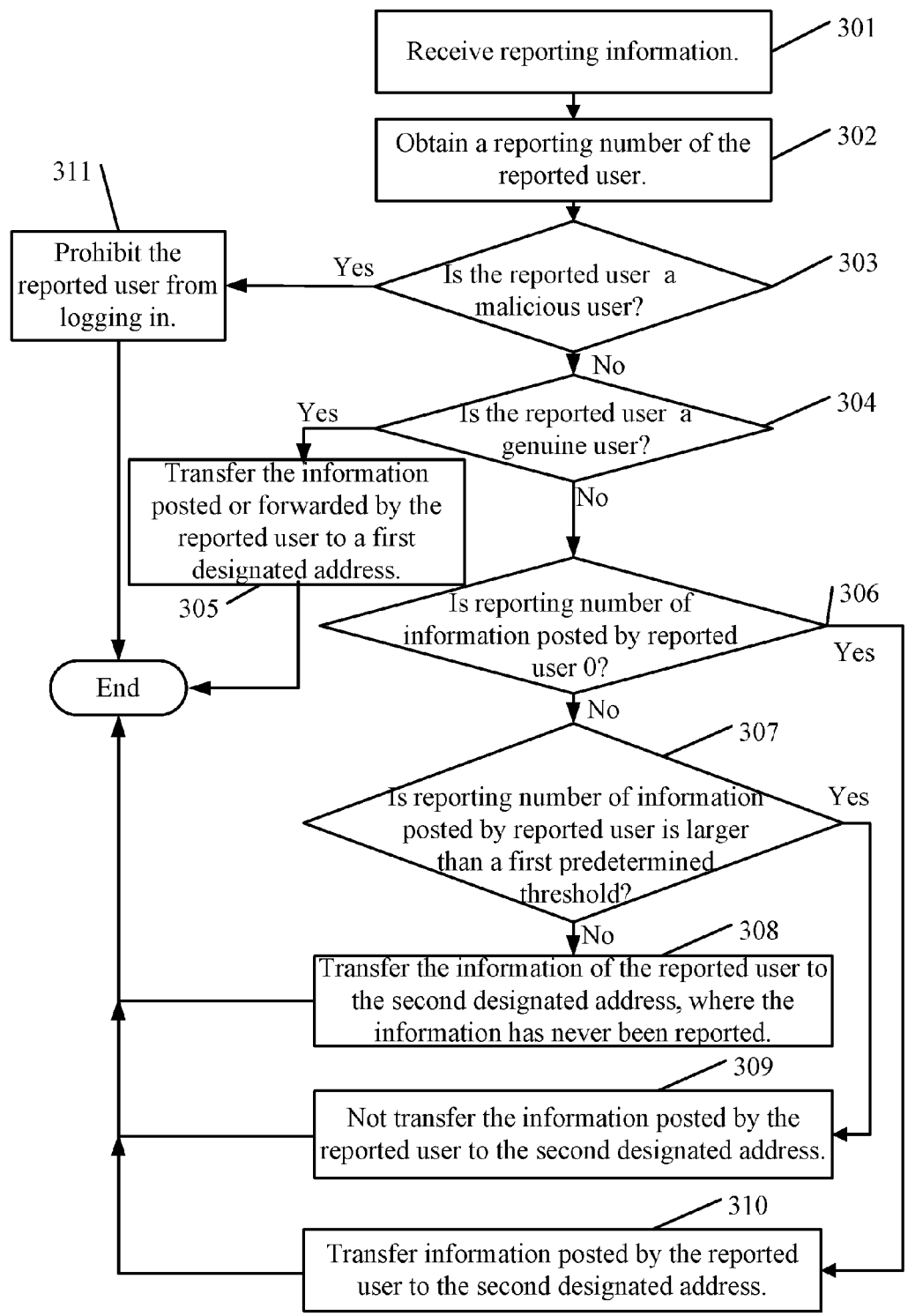
FIG. 3 is a flow chart of an information processing method according to a third embodiment of the present disclosure.

In another embodiment, the present disclosure provides another information processing method. As shown in FIG. 3, the information processing method can be a computer process stored inside a computer readable medium such as optical disk. The information processing method comprises following steps:

Step 301: Receive reporting information. The reporting information comprises information of a reported user and a reported content.

In order to prevent from certain users from posting or forwarding illegal information and prevent illegal information from spreading in the network, when the users read illegal information, the users can report those who post or forward illegal information. The server real-time receives the reporting information from the users, where the reporting information carries the information of the reported user and the reported content.

Step 302: Obtain a reporting number of the reported user.

After a user reads illegal information, the user can report to the server. The reporting number of the reported user may influence the identity of the reported user when the server identifies the reported user. That is, the reported user may be identified as a malicious user, a genuine user, or a user to be determined. The genuine user represents a user who will not ruin the network. The user to be determined represents a user who causes less damage to the network. The malicious user represents a user who ruins the network enormously. That the reporting number of the reported user is more means that the damage on the network caused by the reported user is more. In this embodiment, the reporting number of the reported user includes a reporting number of illegal information posted by the reported user and a reporting number of illegal information forwarded by the reported user.

Moreover, whether a user is a malicious user, a genuine user, or a user to be determined is real time determined according to real time received reporting information.

In this embodiment, as shown in FIG. 3, the present disclosure classifies the reported user into different levels (the above-mentioned malicious user, genuine user, and a user to be determined).

Specifically, the server obtains the reporting number of the reported user according to the reporting information.

Step 303: Determine whether the reported user is a malicious user according to the reporting information. Upon the condition that the reported user is a malicious user, perform step 311. Otherwise, perform step 304.

The present disclosure determines whether the reported user is a malicious user according to the reporting information. The malicious user is reported that he posts/forwards more illegal information.

Specifically, upon the condition that the reporting number of the reported user is greater than a third predetermined threshold, the reporting number of the information posted by the reported user is greater than a fourth predetermined threshold, and the reporting number of the information forwarded by the reported user is greater than a fifth predetermined threshold, the reported user is determined as a malicious user.

The third, fourth, fifth predetermined thresholds can be set according to actual demands. For example, the third predetermined threshold can be 200, the fourth predetermined threshold can be 110, and the fifth predetermined threshold can be 90.

Upon the condition that the reported user is a malicious user, step 311 is performed. Otherwise, step 304 is performed.

Step 304: Determine whether the reported user is a genuine user. Upon the condition that the reported user is a genuine user, perform step 305. Otherwise, perform step 306.

In this step, the present disclosure determines whether the reported user is a genuine user according to the reporting number of the reported user. Upon the condition that the reported user is a genuine user, step 305 is performed. Otherwise, step 306 is performed. Upon the condition that the reporting number of the reported user is not greater than the third predetermined threshold, the reported user is not determined as a malicious user. However, a non-malicious user does not mean that he never posts or forwards illegal information.

If a non-malicious user is allowed to post or forward illegal information, illegal information cannot be controlled.

Therefore, in order to efficiently control the illegal information, the server not only controls the malicious user, but determine whether a non-malicious user is a genuine user or a user to be determined and further processes different operations on different kinds of users.

Specifically, upon the condition that the reporting number of the reported user is less than a second predetermined threshold and the reporting number of the information posted by the reported user is 0, the reported user is determined as a genuine user. Upon the condition that the reporting number of the reported user is greater than the second predetermined threshold but less than the third predetermined threshold, the reported user is determined as a user to be determined. Please note, the third predetermined threshold is greater than the second predetermined threshold.

In this embodiment, the second predetermined threshold can be set according to actual demands. For example, in order to make the reporting information more persuasive and to prevent users from reporting maliciously, the second predetermined threshold can be set as 30.

Upon the condition that the user is a genuine user, the step 305 is performed. Upon the condition that the user is a user to be determined, step 306 is performed.

Step 305: Transfer the information posted or forwarded by the reported user to a first designated address.

The reporting number of a genuine user is less than the second predetermined threshold. It means that the information posted or forwarded by the genuine user contains very little illegal information. Therefore, the server transfers all information posted or forwarded by the genuine user to the first designated address.

In one embodiment, the first designated address can comprise space addresses of friends of the genuine user, related network addresses, etc.

The present disclosure transfer the information posted or forwarded by the genuine user to a friend's space address such that the genuine user can easily read the information in the personal space. Furthermore, the information posted or forwarded by the genuine user is transferred to related websites such that more network users can read the information. This ensures the information posted or forwarded by the genuine user to be shared. The flow is ended.

Step 306: Calculate the reporting number of the information posted by the reported user and determine whether the reporting number of the information posted by the reported user is 0. Upon the condition that the reporting number is 0, perform step 310. Otherwise, perform step 307.

Upon the condition that the reported user is neither a malicious user nor a genuine user, the reported user is a user to be determined Information posted by a user to be determined may contain illegal information or approved information, where the approved information is information which has never been reported. In this step, upon the condition that the reported user is a user to be determined, the present disclosure calculates the reporting number of information posted by the reported user and determines the reporting number of the information posted by the reported user is 0. Upon the condition that the reporting number is 0, step 310 is performed to transfer the information posted by the reported user to a second designated address. Otherwise, step 307 is performed to do a further determination.

The server only transfers approved information to the second designated address without transferring illegal information to the second designated address.

In one embodiment, the second designated address can comprise space addresses of friends of the reported user.

"Friends" can read the approved information posted by the reported user in their own personal space. Only when the friends visit the space of the reported user, the friends can read all information posted by the reported user. The aforementioned "all" information can comprise approved information and illegal information posted by the reported user.

From the above, it can be seen that the present disclosure perform different operations on different kinds of information (illegal information and approved information). This ensures the approved information to be shared and also prevents illegal information from spreading.

The reported content can comprise illegal information posted and forwarded by the reported user. The present disclosure obtains the reporting number of the information posted by the reported user according to the reported content.

The reporting number reflects the number that the reported user posts illegal information. Or, it can represent that the reported user posts less illegal information but the illegal information is reported frequently.

Step 307: Determine whether the reporting number of the information posted by the reported user is greater than a first predetermined threshold. If the reporting number is greater than 0, perform step 309. Otherwise, perform step 308.

Upon the condition that the reporting number of the information posted by the reported user is not 0, the present disclosure further determines whether the reporting number of the information posted by the reported user is greater than the first predetermined threshold. Upon the condition that, the reporting number is greater than 0 but less than the first predetermined threshold, the step 308 is performed. Upon the condition that the reporting number is greater than the first predetermined threshold, the step 309 is performed.

In this embodiment, the first predetermined threshold is an integer greater than 0, and it can be set according to actual demands. For example, if the reported user has posted 100 pieces of information, the first predetermined threshold can be set as 10.

Step 308: Transfer the information of the reported user to the second designated address, where the information has never been reported.

Upon the condition that the reporting number of the information posted by the reported user is greater than 0 but less than the first predetermined threshold, it represents that the reported user only posts few illegal information and possibly has forwarded illegal information.

The server only transfer approved information posted by the reported user to the second designated address without transferring illegal information to the second designated address. The flow is ended.

Step 309: Not transfer the information posted by the reported user to the second designated address.

Upon the condition that the reporting number of the information posted by the reported user is greater than 0 and the predetermined threshold, it represent that the reported user has post more illegal information and possibly forwarded illegal information.

The server does not transfer any information posted by the reported user to the second designated address. In this way, only when friends visit the space of the reported user, the friends can read the information posted by the reported user. The flow is ended.

The present disclosure limits the transfer of illegal information through refusing to transfer illegal information to the second designated address.

Step 310: Transfer information posted by the reported user to the second designated address.

The reporting number of the user to be determined is not 0. The reporting number can comprise the reporting number of the information posted by the reported user and the reporting number of the information forwarded by the reported user.

After the reported user is identified as a user to be determined, different operations are performed on the user to be determined according to the reporting content.

Specifically, the present disclosure determines whether the reporting number of the information posted by the reported user is 0. Upon the condition that the reporting number is 0, it represents that the reporting number that the reported user forwards illegal information is not 0.

Upon the condition that the reported user never posts illegal information but has forwarded illegal information, the server transfers the information posted by the reported user to the second designated address. The flow is ended.

Step 311: Prohibit the reported user from logging in.

In order to prohibit the malicious user from posting illegal information, the server prohibits the malicious user from logging in. This ensures that the malicious user not to post or forward any information.

Table 1 is a level table of reported users of this embodiment of the present disclosure. A genuine user can be classified as high active user and normal active user. A user to be determined can be classified as new user, silent user, user without posting and/or forwarding illegal information, user having little reported information, user having more reported information. A malicious user is a bad user who has posted more illegal information and forwarded more illegal information.

TABLE 1 level table of reported users

| Level | Name of Level | Rank | Remarks |
|---|---|---|---|
| A | Genuine user | A1 | High active user |
|   |   | A1 | Normal active user |
| B | User to be determined | B2 | New user |
|   |   | B2 | Silent user |
|   |   | C1 | User without posting and/or forwarding illegal information |
|   |   | C2 | User having little reported information |
|   |   | C3 | User having more reported information |
| C | Malicious user | D | Bad user having posted more illegal information and forwarded more illegal information |

In this embodiment, the present disclosure receives the reporting information comprising information of the reported user and a reported content; determines whether the reported user is a malicious user; upon the condition that the reported user is a malicious user, prohibits the reported user from logging in; upon the condition that the reported user is not a malicious user, transferring information posted or forwarded by the reported user to the first designated address; upon the condition that the reported user is a user to be determined, transfer the information posted by the reported user according to the information posted by the reported user. Because the present disclosure prohibits the malicious user from logging in to prevent the malicious user from posting illegal information and allows the non-malicious user to continuously post or forward non-illegal information, different kinds of users can execute different experience. This controls and eliminates the malicious users and illegal information.

Figure 4:
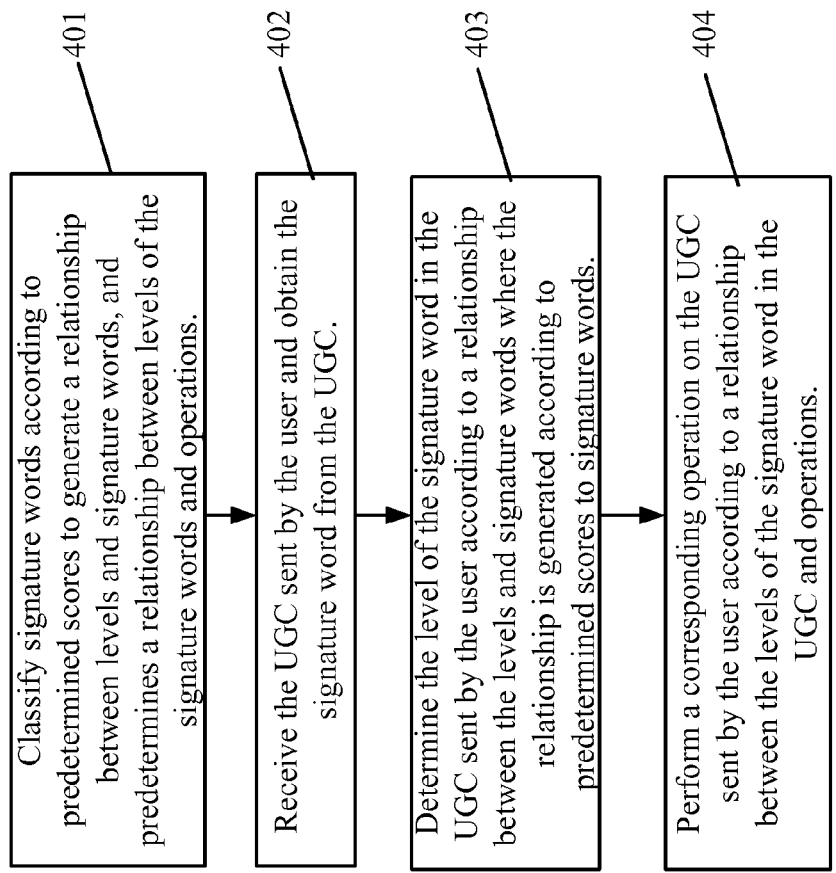
FIG. 4 is a flow chart of an information processing method according to a fourth embodiment of the present disclosure.

Please refer to FIG. 4, which is a flow chart of an information processing method according to another embodiment of the present disclosure. It comprises following steps:

Step 401: Classify signature words according to predetermined scores to generate a relationship between levels and signature words, and predetermines a relationship between levels of the signature words and operations.

In this embodiment, Falun Dafa promotion and other political contents which ruin the societies are classified as first-order signature word, porn is classified as second-order signature word, and commercials are classified as third-order signature word.

Furthermore, the operation corresponding to the first-order signature word is to prohibit the UGC containing the first-order signature word. The second-order and third-order signature words are allowed to be posted, but they have to be collected into the human checking database to be examined by humans. The signature words contained inside the UGC posted by the user are classified and scored according to an ordinary processing result and a man-made deleting rate. In addition, the present disclosure provides different operations and hints according to different levels and scores. For example, they may be a permission of friends to read-only, a permission of a user to read-only, a permission of anyone to read-only without forwarding or sharing, and no permission of posting, alone or in a combination, to control the transmission range.

Step 402: Receive the UGC sent by the user and obtain the signature word from the UGC.

In this embodiment, a signature word database is set up inside a back end, where different signature words have different scores. The back end scans the entire UGC sent by the user and simultaneously calculates the score of each signature word. For example, if the UGC contains "indoor service" and the signature word database also contains "indoor service", "indoor service" is the signature word obtained from the UGC.

Step 403: Determine the level of the signature word in the UGC sent by the user according to a relationship between the levels and signature words where the relationship is generated according to predetermined scores to signature words.

Step 404: Perform a corresponding operation on the UGC sent by the user according to a relationship between the levels of the signature word in the UGC and operations.

Upon the condition that the signature word inside the UGC is the first-order signature word, the present disclosure does not allow the user to post it, and recommends user has to delete the signature word first and then post the UGC.

Upon the condition that the signature word inside the UGC is the second-order signature word or third-order signature word, etc. The present disclosure allows the user to post it, but the UGC should be recorded into the human checking database to be examined by humans. The signature words contained inside the UGC posted by the user are classified and scored according to an ordinary processing result and a man-made deleting rate. In addition, the present disclosure provides different operations and hints according to different levels and scores. For example, they may be a permission of friends to read-only, a permission of a user to read-only, a permission of anyone to read-only without forwarding or sharing, and no permission of posting, alone or in a combination, to control the transmission range. In order to raise the hit rate, the signature word back end has clear data including the hitting condition and man-made deletion condition to real time operate.

Figure 5:
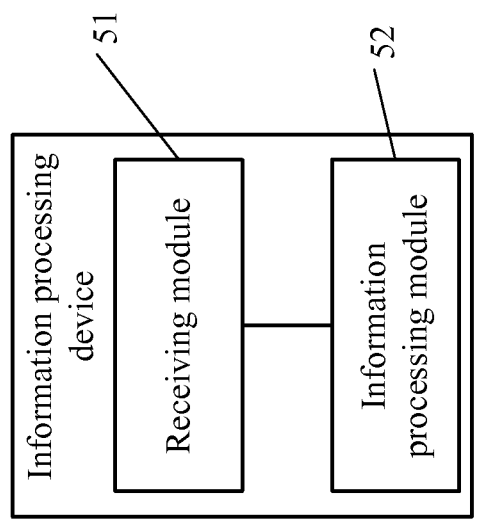
FIG. 5 is a diagram of an information processing device according to a first embodiment of the present disclosure.

FIG. 5 is a diagram of an information processing device according to a first embodiment of the present disclosure. As shown in FIG. 5, the information processing device can be used to execute the above-mentioned steps of the first embodiment, and further illustration is thus omitted here. The information processing device comprises a receiving module 51 and an information processing module 52. The receiving module 51 is used to receive network information. The information processing module 52 is used to determine a level of a network object corresponding to the network information according to the network information, and performing a control process according to the level of the network object.

Figure 6:
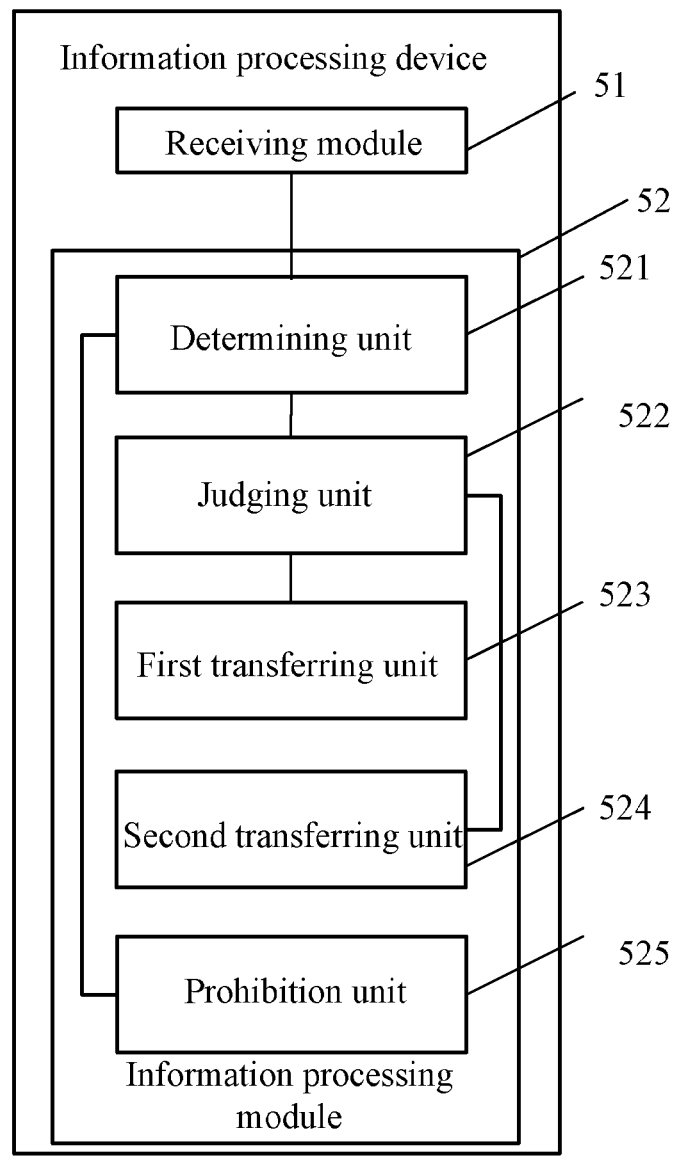
FIG. 6 is a diagram of an information processing device according to a second embodiment of the present disclosure.

FIG. 6 is a diagram of an information processing device according to a second embodiment of the present disclosure. As shown in FIG. 6, the information processing device can be used to execute the above-mentioned steps of the second embodiment, and further illustration is thus omitted here. In this embodiment, the network information is reporting information, and the network object corresponding to the network information is a reported user. In this embodiment, the information processing device is based on the information processing device shown in FIG. 5. The receiving module 51 is used to receive the reporting information, where the reporting information comprises information of the reported user and a reported content. The information processing module 52 comprises a determining unit 521, a judging unit 522, a first transferring unit 523, a second transferring unit 524, and a prohibition unit 525.

The determining unit 521 is used to determine whether the reported user is a malicious user according to the reported content.

The judging unit 522 is used for determining whether the reported user is a genuine user or a user to be determined upon the condition that the reported user is not a malicious user The first transferring unit 523 is used for transferring information posted or forwarded by the reported user to a first designated address upon the condition that the reported user is a genuine user.

The second transferring unit 524 is used for transferring information posted by the reported user according to a reporting number of the information posted by the reported user upon the condition that the reported user is a user to be determined.

The prohibition unit 525 is used for prohibiting the reported user from logging in upon the condition that the reported user is a malicious user.

In this embodiment, the information processing device real time receives the reporting information, where the reporting information comprises information of the reported user and a reported content; determines whether the reported user is a malicious user according to the reported content; upon the condition that the reported user is a malicious user, prohibiting the reported user from logging in; upon the condition that the reported user is not a malicious user, determining whether the reported user is a genuine user or a user to be determined; upon the condition that the reported user is a genuine user, transferring information posted or forwarded by the reported user to a first designated address; and upon the condition that the reported user is a user to be determined, transferring information posted by the reported user according to a reporting number of the information posted by the reported user. Because the present disclosure prohibits the malicious user from logging in, this prevents the malicious users from continuously posting or forwarding illegal information and allows non-malicious users continuously to post or forward not-illegal information. Different kinds of users can execute differential experiences and thus control and eliminate the malicious users and illegal information.

Figure 7:
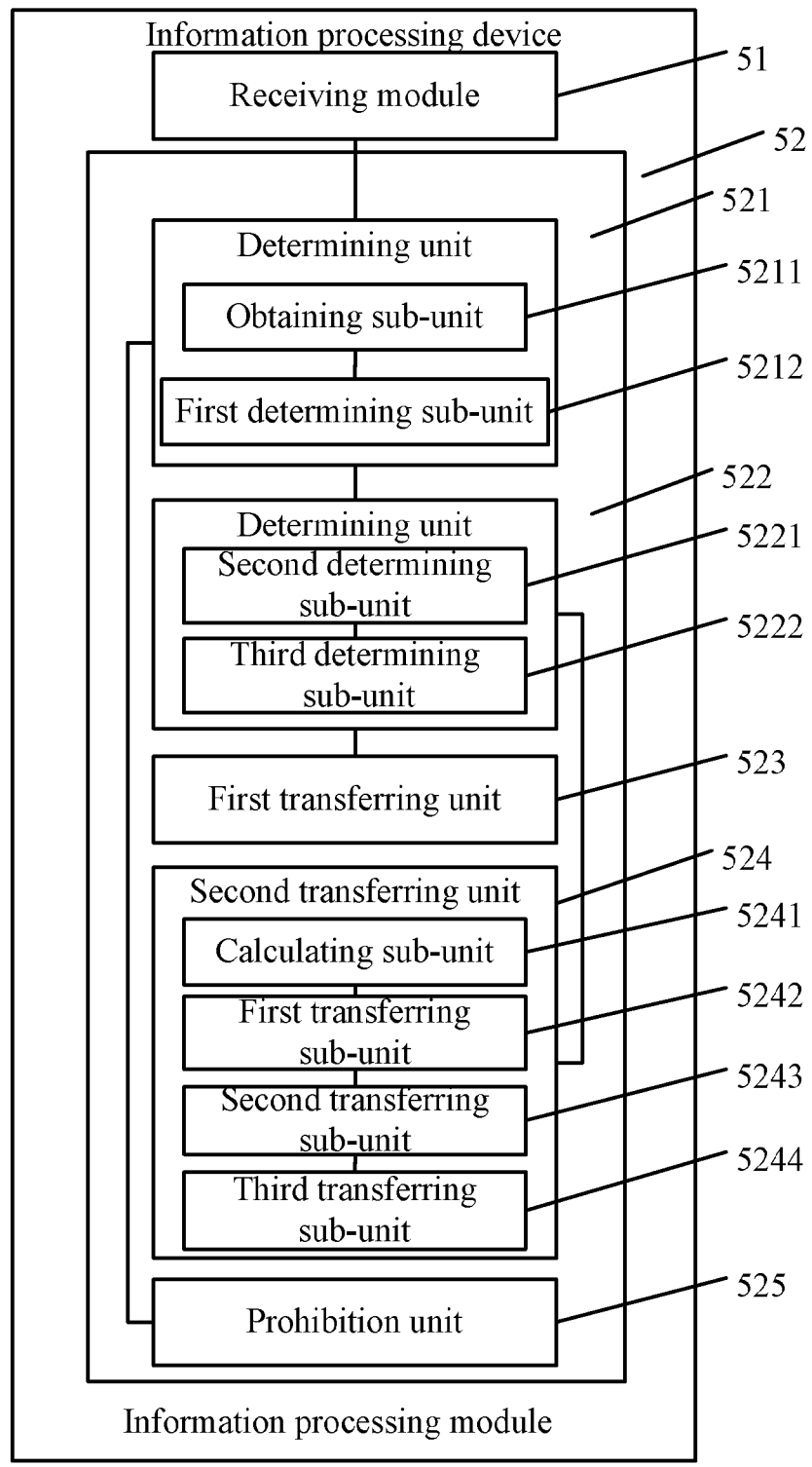
FIG. 7 is a diagram of an information processing device according to a third embodiment of the present disclosure.

In addition, the present disclosure further provides another information processing device. As shown in FIG. 7, the information processing device can execute the above-mentioned steps of the third embodiment, and further illustration is omitted here. The information processing device is based on the information processing device shown in FIG. 6. The determining unit 521 comprises an obtaining sub-unit 5211 and a first determining sub-unit 5212.

The determining unit 522 comprises a second determining sub-unit 5221 and a third determining 5222.

The second transferring unit 524 comprises a calculating sub-unit 5241, a first transferring sub-unit 5242, a second transferring sub-unit 5243, and a third transferring sub-unit 5244.

The receiving module 51 is used to receive the reporting information, where the reporting information comprises information of the reported user and a reported content.

In order to prevent some users from spreading illegal information and stop the transmission of the illegal information, when a user read the illegal information on the network, the user can report those who posted or forwarded illegal information. The receiving module 51 receives the reporting information sent by the user, where the reporting information carries information of a reported user and a reported content.

The determining unit 521 is used for determining whether the reported user is a malicious user.

The determining unit 521 determines whether the reported user is a malicious user according to the reported content. The malicious user is a user who is reported to post more illegal information and is reported to forward more illegal information.

Specifically, the obtaining sub-unit 5211 is used for obtaining the reporting number of the reported user.

The first determining sub-unit 5212 is used for determining that the reported user is a malicious user upon the condition that the reporting number of the reported user is greater than a third predetermined threshold, the reporting number of the information posted by the reported user is greater than a fourth predetermined threshold, and a reporting number of the information forward by the reported user is greater than a fifth predetermined threshold.

The judging unit 522 is used for determining whether the reported user is a genuine user or a user to be determined upon the condition that the reported user is not a malicious user.

A reported user whose reporting number is not greater than the third predetermined threshold is not determined as a malicious user. But a non-malicious user may have posted or forward illegal information.

If the non-malicious user continuously posts or forwards illegal information, the illegal information cannot be controlled.

Therefore, in order to control the illegal information, the server not only performs a corresponding control on the malicious user, but determines whether the reported user is a genuine user or a user to be determined to perform different operations on different kinds of users.

Specifically, the second determining sub-unit 5221 is used for determining that the reported user is a genuine user upon the condition that the reporting number of the reported user is less than a second predetermined threshold and the reporting number of the information posted by the reported user is 0.

The third determining sub-unit is used for determining that the reported user is a user to be determined upon the condition that the reporting number of the reported user is greater than the second predetermined threshold but less than the third predetermined threshold. The third predetermined threshold is greater than the second predetermined threshold.

The first transferring unit 523 is used for transferring the information posted by the reported user to the first designated address upon the condition that the reported user is a genuine user.

The reporting number of a genuine user is less than the second predetermined value. It means that the information posted by the genuine user contains very few illegal information. Therefore, the first transferring unit 523 transfer all the information posted by the genuine user to the first designated address.

The second transferring unit 524 is used for transferring the information posted by the reported user according to the information posted by the reported user upon the condition that the reported user is a user to be determined. That is, the second transferring unit 524 decides whether to transfer the information to the second designated address.

Information posted by a user to be determined may contain illegal information and approved information. The approved information is information which has not never been reported.

The second transferring unit 524 transfers the approved information to the second designated address without transferring the illegal information to the second designated address.

Specifically, the calculating sub-unit 5241 is used for calculating the reporting number of the information posted by the reported user.

The first transferring sub-unit 5242 is used for transferring the information posted or forwarded by the reported user to a second designated address upon the condition that the reporting number of the information posted by the reported user is 0.

The second transferring sub-unit 5243 is used for transferring the information posted or forwarded by the reported user but never been reported to the second designated address upon the condition that the reporting number of the information posted by the reported user is greater than 0 and less than a first predetermined threshold.

The third transferring sub-unit 5244 is used for not transferring the information posted or forwarded by the reported user to the second designated address upon the condition that the reporting number of the information posted by the reported user is greater than the first predetermined threshold.

The first predetermined threshold is an integer greater than 0.

The prohibition unit 525 is used for prohibiting the reported user from logging in upon the condition that the reported user is a malicious user In order to prohibit the malicious user from continuously posting illegal information, the prohibition unit 525 prohibits the malicious user from logging in such that the malicious user is no longer able to post or forward any information.

In this embodiment, the information processing device real time receives the reporting information, where the reporting information comprises information of the reported user and a reported content; determines whether the reported user is a malicious user according to the reported content; upon the condition that the reported user is a malicious user, prohibits the reported user from logging in to prevent the malicious user from continuously posting illegal information. Because the present disclosure prohibits the malicious user from logging in, this prevents the malicious users from continuously posting or forwarding illegal information and allows non-malicious users continuously to post or forward not-illegal information. Different kinds of users can execute differential experiences and thus control and eliminate the malicious users and illegal information.

Figure 8:
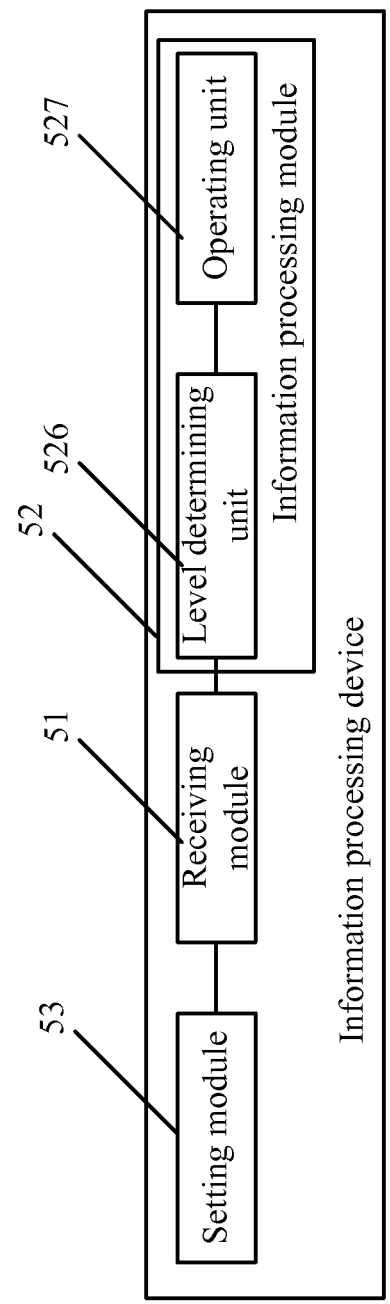
FIG. 8 is a diagram of an information processing device according to a fourth embodiment of the present disclosure.

FIG. 8 is a diagram of an information processing device according to a fourth embodiment of the present disclosure. As shown in FIG. 8, the present disclosure provides an information processing device capable of executing the above-mentioned steps of the fourth embodiment, and further illustration is omitted here. In this embodiment, the network information is the UGC sent by the user, and the network object corresponding to the network information is the UGC. In this embodiment, the information processing device is based on the information processing device shown in FIG. 5. The receiving module 51 is used for receiving the UGC sent by the user and obtaining a signature word from the UGC. Specifically, a signature word database is set up inside a back end, where different signature words have different scores. The back end scans the entire UGC sent by the user and simultaneously calculates the score of each signature word. For example, if the UGC contains "indoor service" and the signature word database also contains "indoor service", "indoor service" is the signature word obtained from the UGC.

The information processing module 52 comprises a level determining unit 526 and an operating unit 527.

The level determining unit is used for determining the level of the signature word according to a predetermined relationship between signature words and levels, wherein the predetermined relationship is formed according to predetermined scores to signature words.

The operating unit 527 is used for performing a corresponding operation on the UGC according to the level of the signature word and a predetermined relationship between the levels and operations. Upon the condition that the level of the signature word inside the UGC is not corresponding to the first-order signature word, it is allowed to be posted, but has to be collected into the human checking database to be examined by humans. The signature words contained inside the UGC posted by the user are classified and scored according to an ordinary processing result and a man-made deleting rate. In addition, the present disclosure provides different operations and hints according to different levels and scores. For example, they may be a permission of friends to read-only, a permission of a user to read-only, a permission of anyone to read-only without forwarding or sharing, and no permission of posting, alone or in a combination, to control the transmission range.

The information processing device can further comprise a setting module 53 for predetermining the corresponding relationship between the levels of signature words and operations according to the scores to the signature words, and predetermining the relationship between levels of the signature words and the operations.

In this embodiment, upon the condition that the level of the signature word inside the UGC is not corresponding to the first-order signature word, it is allowed to be posted, but has to be collected into the human checking database to be examined by humans. The signature words contained inside the UGC posted by the user are classified and scored according to an ordinary processing result and a man-made deleting rate. In addition, the present disclosure provides different operations and hints according to different levels and scores. Therefore, the present disclosure improves the user experience. Furthermore, in the related art, although the second-order or third-order signature words are allowed to be posted, there is a high possibility to be deleted by the back end. Or, in the related art, the examination process takes a lot of time, and influence the user experience. The present disclosure can solve the above-mentioned problems.

Moreover, the present disclosure further provides an information processing device, which can comprise a storage device and a processor. The storage device is used for storing instructions. The processor is coupled to the storage device, and is used to execute the instructions stored inside the storage device to receive network information, determine a level of a network object corresponding to the network information according to the network information, and perform a control process on the network object according to the level of the network object corresponding to the network information.

The present disclosure further provides a server, which comprises any one of an information processing device shown in FIG. 5-FIG. 8.

From the above, one having ordinary skills in the art can clearly understand that the present disclosure can be implemented with software and needed common hardware. Surely, the present disclosure can be implemented with only hardware. But in many conditions, implemented with software and needed common hardware would be better. Under such an understanding, the present disclosure can be produced as a software product, which is stored inside a readable medium (such as a floppy disk, hard disk, or optical disk). The software product comprises several instructions such that a computer (such as a personal computer, server, or network equipment) can execute the instruction to perform the above-mentioned information processing methods.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. An information processing method, comprising:
   using a server comprising a processor and a memory comprising a plurality of program instructions executable by the processor to receive reporting information comprising information of a reported user and a reported content;
   using the processor to execute the plurality of program instructions to determine a level of the reported user corresponding to the reporting information according to the reporting information; and
   using the processor to execute the plurality of program instructions to determine whether the reported user is a malicious user according to the reported content;
   upon a condition that the reported user is a malicious user, using the processor to execute the plurality of program instructions to prohibit the reported user from logging in;
   upon a condition that the reported user is not a malicious user, using the processor to execute the plurality of program instructions to determine whether the reported user is a genuine user or a user to be determined;
   upon a condition that the reported user is a genuine user, using the processor to execute the plurality of program instructions to transfer information posted or forwarded by the reported user to a first designated address; and
   upon a condition that the reported user is a user to be determined, using the processor to execute the plurality of program instructions to transfer information posted by the reported user according to a reporting number of the information posted by the reported user.

2. The information processing method of claim 1, wherein a step of using the processor to execute the memory comprising the plurality of program instructions to transfer information posted by the reported user according to the reporting number of the information posted by the reported user comprises:
   using the processor to execute the plurality of program instructions to calculate the reporting number of the information posted by the reported user;
   upon a condition that the reporting number of the information posted by the reported user is 0, using the processor to execute the plurality of program instructions to transfer the information posted or forwarded by the reported user to a second designated address;
   upon a condition that the reporting number of the information posted by the reported user is greater than 0 and less than a first predetermined threshold, using the processor to execute the plurality of program instructions to transfer the information posted or forwarded by the reported user but never been reported to the second designated address;
   upon a condition that the reporting number of the information posted by the reported user is greater than the first predetermined threshold, using the processor to execute the plurality of program instructions not to transfer the information posted or forwarded by the reported user to the second designated address;
   wherein the first predetermined threshold is an integer greater than 0.

3. The information processing method of claim 1, wherein the malicious user, the genuine user, the user to be determined are real time determined according to the real time reported information.

4. The information processing method of claim 3, wherein a step of using the processor to execute the plurality of program instructions to determine whether the reported user is a malicious user according to the reported content comprises:
   using the processor to execute the plurality of program instructions to obtain a reporting number of the reported user;
   upon a condition that the reporting number of the reported user is greater than a third predetermined threshold, the reporting number of the information posted by the reported user is greater than a fourth predetermined threshold, and a reporting number of the information forward by the reported user is greater than a fifth predetermined threshold, then using the processor to execute the plurality of program instructions to determine that the reported user is a malicious user.

5. The information processing method of claim 4, wherein a step of using the processor to execute the plurality of program instructions to determine whether the reported user is genuine user or a user to be determined comprises:
   upon a condition that the reporting number of the reported user is less than a second predetermined threshold and the reporting number of the information posted by the reported user is 0, then determining that the reported user is a genuine user; and
   upon a condition that the reporting number of the reported user is greater than the second predetermined threshold but less than the third predetermined threshold, then determining that the reported user is a user to be determined;
   wherein the third predetermined threshold is greater than the second predetermined threshold.

6. The information processing method of claim 1, wherein the reporting information is a user generated content (UGC)

sent by a user, the reported user corresponding to the reporting information is the UGC, a step of using a server comprising a processor and a memory comprising a plurality of program instructions executable by the processor to receive the reporting information comprises: using the server comprising the processor and the memory comprising the plurality of program instructions executable by the processor to receive the UGC sent by the user, and to obtain a signature word from the UGC, a step of using the processor to execute the plurality of program instructions to determine the level of the reported user comprises: using the processor to execute the plurality of program instructions to determine the level of the signature word according to a predetermined relationship between signature words and levels, wherein the predetermined relationship formed according to predetermined scores to signature words; and the information processing method further comprises: using the processor to execute the plurality of program instructions to perform a corresponding operation on the UGC according to the level of the signature word and a predetermined relationship between the levels and operations.

7. The information processing method of claim 6, wherein a step of using the processor to execute the plurality of program instructions to perform the corresponding operation on the UGC according to the level of the signature word and the predetermined relationship between the levels and the operations comprises:
upon a condition that the level of the signature word in the UGC is not corresponding to a first-level signature word, using the processor to execute the plurality of program instructions to permit the user to send the UGC, to classify and to grade the signature word in the UGC according to an ordinary processing result and a man-made deleting rate, to perform different operation according to different levels and scores;
wherein the first-level signature word represents political content influencing or damaging societies.

8. The information processing method of claim 7, wherein the different operations comprises a permission of friends to read-only, a permission of a user to read-only, a permission of anyone to read-only without forwarding or sharing, and no permission of posting, alone or in a combination.

9. The information processing method of claim 7, wherein the step of using the processor to execute the plurality of program instructions to perform the corresponding operation on the UGC according to the level of the signature word and the predetermined relationship between the levels and the operations comprises:
upon a condition that the level of the signature word in the UGC is corresponding to a first-level signature word, using the processor to execute the plurality of program instructions to refuse the user to post the UGC.

10. The information processing method of claim 6, before a step of receiving the UGC sent by the user, the information processing method further comprising:
using the processor to execute the plurality of program instructions to predetermined the corresponding relationship between the levels of signature words and operations according to the scores to the signature words, and to predetermine the relationship between levels of the signature words and the operations.

11. The information processing method of claim 6, wherein the step of using the processor to execute the plurality of program instructions to obtain the signature word from the UGC comprises:
using the processor to execute the plurality of program instructions to perform a full scan on the UGC sent by the user, obtaining the signature word contained inside the UGC, to calculate a score of the signature word according to a signature word database set inside a back end, wherein different signature words correspond to different scores inside the signature word database.

12. An information processing apparatus, comprising:
a processor; and
a memory connected with processor, the memory comprising a plurality of program instructions executable by the processor, the plurality of program instructions comprising:
a receiving module, configured to cause the processor to receive reporting information comprising information of a reported user and a reported content;
an information processing module, configured to cause the processor to determine a level of the reported user corresponding to the reporting information according to the reporting information, and to perform a control process according to the level of the reported user, the information processing module comprising:
a determining unit, configured to cause the processor to determine whether the reported user is a malicious user according to the reported content;
a prohibition unit, configured to cause the processor to prohibit the reported user from logging in upon a condition that the reported user is a malicious user;
a judging unit, configured to cause the processor to determine whether the reported user is a genuine user or a user to be determined upon a condition that the reported user is not a malicious user;
a first transferring unit, configured to cause the processor to transfer information posted or forwarded by the reported user to a first designated address upon a condition that the reported user is a genuine user; and
a second transferring unit, configured to cause the processor to transfer information posted by the reported user according to a reporting number of the information posted by the reported user upon a condition that the reported user is a user to be determined.

13. The information processing apparatus of claim 12, wherein the second transferring unit comprises:
a computing sub-unit, configured to cause the processor to calculate the reporting number of the information posted by the reported user;
a first transferring sub-unit, configured to cause the processor to transfer the information posted or forwarded by the reported user to a second designated address upon a condition that the reporting number of the information posted by the reported user is 0;
a second transferring sub-unit, configured to cause the processor to transfer the information posted or forwarded by the reported user but never been reported to the second designated address upon a condition that the reporting number of the information posted by the reported user is greater than 0 and less than a first predetermined threshold; and
a third transferring sub-unit, configured to cause the processor not to transfer the information posted or forwarded by the reported user to the second designated address upon a condition that the reporting number of the information posted by the reported user is greater than the first predetermined threshold;
wherein the first predetermined threshold is an integer greater than 0.

14. The information processing apparatus of claim 12, wherein the malicious user, the genuine user, the user to be determined are real time determined according to the real time reported information.

15. The information processing apparatus of claim 14, wherein the determining unit comprises:
an obtaining sub-unit, configured to cause the processor to obtain a reporting number of the reported user; and
a first determining sub-unit, configured to cause the processor to determine that the reported user is a malicious user upon a condition that the reporting number of the reported user is greater than a third predetermined threshold, the reporting number of the information posted by the reported user is greater than a fourth predetermined threshold, and a reporting number of the information forward by the reported user is greater than a fifth predetermined threshold.

16. The information processing apparatus of claim 15, wherein the judging unit comprises:
a second determining sub-unit, configured to cause the processor to determine that the reported user is a genuine user upon a condition that the reporting number of the reported user is less than a second predetermined threshold and the reporting number of the information posted by the reported user is 0; and
a third determining sub-unit, configured to cause the processor to determine that the reported user is a user to be determined upon a condition that the reporting number of the reported user is greater than the second predetermined threshold but less than the third predetermined threshold;
wherein the third predetermined threshold is greater than the second predetermined threshold.

17. The information processing apparatus of claim 12, wherein the reporting information is a user generated content (UGC) sent by a user, the reported user corresponding to the reporting information is the UGC, the receiving module configured to cause the processor to receive the UGC sent by the user, and to obtain a signature word from the UGC; the information processing module comprises:
a level determining unit, configured to cause the processor to determine the level of the signature word according to a predetermined relationship between signature words and levels, wherein the predetermined relationship is formed according to predetermined scores to signature words; and
an operating unit, configured to cause the processor to perform a corresponding operation on the UGC according to the level of the signature word and a predetermined relationship between the levels and operations.

18. The information processing apparatus of claim 17, wherein the operating unit comprises:
a sending sub-unit, configured to cause the processor to permit the user to send the UGC upon a condition that the level of the signature word in the UGC is not corresponding to a first-level signature word, to classify and to grade the signature word in the UGC according to an ordinary processing result and a man-made deleting rate, and to perform different operation according to different levels and scores;
wherein the first-level signature word represents political content influencing or damaging societies.

19. The information processing apparatus of claim 18, wherein the operation unit further comprises:
a refusing sub-unit, configured to cause the processor to refuse the user to post the UGC upon a condition that the level of the signature word in the UGC is corresponding to a first-level signature word.

20. The information processing apparatus of claim 17, further comprising:
a setting module, configured to cause the processor to determine the corresponding relationship between the levels of signature words and operations according to the scores to the signature words, and to predetermine the relationship between levels of the signature words and the operations.

21. A non-transitory computer readable medium, storing an instruction set, wherein when the instruction set is executed, a machine reading the computer readable medium is capable of executing an information processing method, the information processing method comprising:
using a server comprising a processor and a memory comprising a plurality of program instructions executable by the processor to receive reporting information comprising information of a reported user and a reported content;
using the processor to execute the plurality of program instructions to determine a level of the reported user corresponding to the reporting information according to the reporting information; and
using the processor to execute the plurality of program instructions to determine whether the reported user is a malicious user according to the reported content;
upon a condition that the reported user is a malicious user, using the processor to execute the plurality of program instructions to prohibit the reported user from logging in;
upon a condition that the reported user is not a malicious user, using the processor to execute the plurality of program instructions to determine whether the reported user is a genuine user or a user to be determined;
upon a condition that the reported user is a genuine user, using the processor to execute the plurality of program instructions to transfer information posted of forwarded by the reported user to a first designated address; and
upon a condition that the reported user is a user to be determined, using the processor to execute the plurality of program instructions to transfer information posted by the reported user according to a reporting number of the information posted by the reported user.

22. A server, comprising an information processing apparatus, the information processing apparatus, comprising:
a processor; and
a memory connected with processor, the memory comprising a plurality of program instructions executable by the processor, the plurality of program instructions comprising:
a receiving module, configured to cause the processor to receive reporting information comprising information of a reported user and a reported content;
an information processing module, configured to cause the processor to determine a level of the reported user corresponding to the reporting information according to the reporting information, and to perform a control process according to the level of the reported user, the information processing module comprising:
a determining unit, configured to cause the processor to determine whether the reported user is a malicious user according to the reported content;
a prohibition unit, configured to cause the processor to prohibit the reported user from logging in upon a condition that the reported user is a malicious user;

a judging unit, configured to cause the processor to determine whether the reported user is a genuine user or a user to be determined upon a condition that the reported user is not a malicious user;

a first transferring unit, configured to cause the processor to transfer information posted or forwarded by the reported user to a first designated address upon a condition that the reported user is a genuine user; and a second transferring unit, configured to cause the processor to transfer information posted by the reported user according to a reporting number of the information posted by the reported user upon a condition that the reported user is a user to be determined.

* * * * *